United States Patent
Bolam et al.

[11] Patent Number: 6,154,781
[45] Date of Patent: Nov. 28, 2000

[54] PUBLISH AND SUBSCRIBE DATA PROCESSING WITH SUBSCRIBER OPTION TO REQUEST SUBSCRIPTION PROPAGATION PRIOR TO ACKNOWLEDGEMENT

[75] Inventors: Steven William Bolam, Eastleigh; Brian Clive Homewood, Winchester; Andrew Hickson, West Wellow; John Michael Knapman, Eastleigh; David Ware, Romsey, all of United Kingdom

[73] Assignee: International Business Machines Corporation, Armonk, N.Y.

[21] Appl. No.: 09/289,011

[22] Filed: Apr. 9, 1999

[30] Foreign Application Priority Data

Dec. 24, 1998 [GB] United Kingdom ............... 9828762

[51] Int. Cl.$^7$ .............................. G06F 13/38; G06F 15/17
[52] U.S. Cl. .............................. 709/238; 709/224; 707/1; 707/6; 706/62
[58] Field of Search .............................. 706/62; 709/224; 707/6, 1

[56] References Cited

U.S. PATENT DOCUMENTS

| | | | |
|---|---|---|---|
| 5,768,528 | 6/1998 | Stumm | 395/200.61 |
| 5,867,799 | 2/1999 | Lang et al. | 707/1 |
| 5,983,214 | 11/1999 | Lang et al. | 707/1 |
| 5,987,460 | 11/1999 | Niwa et al. | 707/6 |
| 5,999,975 | 12/1999 | Kittaka et al. | 709/224 |
| 6,014,654 | 1/2000 | Ariyoshi | 706/62 |

OTHER PUBLICATIONS

Research Disclosure, Oct. 1, 1998, v41,n414, "Method of Maintaining Continuity of Messages over Publish/Subscribe System Failures".

*Primary Examiner*—Zarni Maung
*Assistant Examiner*—Farzaneh Farahi
*Attorney, Agent, or Firm*—Edward H. Duffield

[57] ABSTRACT

In a publish/subscribe data processing broker network having a plurality of broker data processing apparatuses each of which has an input for receiving published messages directly from a publisher application and/or receiving subscription data from a subscriber application, a first broker apparatus has: a software unit for receiving via said input subscription data from a subscriber application; a software unit for providing an acknowledgement to said subscriber application to acknowledge that the subscription data has been received; a software unit for propagating said subscription data to a group of other broker apparatuses; a software unit for determining whether said means for propagating has propagated said subscription data to the group of other broker apparatuses; and a software unit for receiving via said input an indication from said subscriber application that said acknowledgement should not be sent to the subscriber application until the means for determining has determined that said means for propagating has propagated said subscription data to the group of other broker apparatuses.

6 Claims, 4 Drawing Sheets

PUBLISH AND SUBSCRIBE DATA PROCESSING WITH SUBSCRIBER OPTION TO REQUEST SUBSCRIPTION PROPAGATION PRIOR TO ACKNOWLEDGEMENT

FIELD OF THE INVENTION

The present invention relates to the field of data processing and more specifically to data processing which distributes messages from suppliers (called, hereinafter, "publishers") of data messages to consumers (called, hereinafter "subscribers") of such messages.

BACKGROUND OF THE INVENTION

Publish/subscribe data processing systems have become very popular in recent years as a way of distributing data messages from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of stock market data.

In such systems, publisher applications of data messages do not need to know the identity or location of the subscriber applications which will receive the messages. The publishers need only connect to a publish/subscribe distribution agent process, which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The subscribers need only connect to a distribution agent process.

One such publish/subscribe system which is currently in use, and which has been developed by the Transarc Corp. (a wholly owned subsidiary of the assignee of the present patent application, IBM Corp.) is shown in FIG. 1. Publishers 11 and 12 connect to the publish/subscribe broker network 2 and send published messages to broker network 2 which distributes the messages to subscribers 31, 32, 33, 34. Publishers 11 and 12, which are data processing applications which output data messages, connect to broker network 2 using the well known inter-application data connection protocol known as remote procedure call (or RPC). Each publisher application could be running on a separate machine, alternatively, a single machine could be running a plurality of publisher applications. The broker network 2 is made up of a plurality of distribution agents (21 through 27) which are connected in a hierarchial fashion which will be described below as a "tree structure". These distribution agents, each of which could be running on a separate machine, are data processing applications which distribute data messages through the broker network 2 from publishers to subscribers. Subscriber applications 31, 32, 33 and 34 connect to the broker network 2 via RPC in order to receive published messages.

Publishers 11 and 12 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker network 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams. Likewise, subscribers provide the leaf distribution agents 31 through 34 with the name of the streams to which they would like to subscribe. In this way, the broker network 2 keeps track of which subscribers are interested in which streams so that when publishers publish messages to such streams, the messages can be distributed to the corresponding subscribers. Subscribers are also allowed to provide filter expressions to the broker network in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

The above-described publish/subscribe architecture provides the advantage of central coordination of all published messages, since all publishers must connect to the same distribution agent (the root) in order to publish a message to the broker network. For example, total ordering of published messages throughout the broker network is greatly facilitated, since the root can easily assign sequence numbers to each published message on a stream. However, this architecture also has the disadvantage of publisher inflexibility, since each publisher is constrained to publishing from the single root distribution agent, even when it would be much easier for a publisher to connect to a closer distribution agent.

Accordingly, publish/subscribe software designers are beginning to consider architectures where publishers are allowed to publish messages directly to any distribution agent in the broker network. This clearly has the advantage of removing the above-mentioned constraint on publishers. However, as with any tradeoff, it presents other problems. One of the major problems is that a subscriber application is not given any assurance (guarantee) that the subscriber application will receive publications from all publisher applications that might publish to any possible broker (since a publisher application can publish to any broker in this type of architecture). This is because the subscriber is not visible to all potential publishers until the subscription has reached all brokers where there is a potential publisher.

Specifically, when a subscriber application located in London registers a new subscription, it communicates directly with its local broker (also referred to herein as a distribution agent) also located in London and registers its subscription to a given topic with the local broker. The local broker then returns an acknowledgement to inform the subscriber that the subscription has been received. The local broker then passes along the subscription to other brokers (e.g., in New York and Hong Kong) in the broker network so that no matter which broker a publisher communicates directly with, published messages from such a publisher will be distributed to the subscriber. However, the subscriber can not be sure that it will receive published messages from publishers no matter which broker a publisher happens to connect to. Instead, the subscriber can only be assured that it will receive published messages from a publisher that communicates directly with the same local broker that the subscriber has registered its subscription with.

For example, the subscriber in London can not be sure that his subscription has been sent to the broker in Hong Kong and if, for some reason, the subscription data only reaches New York and not Hong Kong, the subscriber in London will only receive messages from London and New York but not from Hong Kong, and the London subscriber will have no idea that it is not receiving any messages from Hong Kong (because oftentimes the content of the messages doe not provide an indication of where the published message originated from).

As the information being exchanged in such a publish/subscribe broker network is often of critical importance, this lack of certainty can be a big problem which inhibits the wide scale deployment of such broker network systems. That is, given this problem, people may opt for using a more direct means of disseminating messages (where information consumers connect directly to information providers) rather than use an intermediary broker, but this would not make possible the many advantages made possible via a broker network.

There is thus a great need in the publish/subscribe broker network art for a way of providing subscribers with a higher degree of certainty that they will receive published messages irrespective of the location of the broker from which these published messages have entered the broker network.

SUMMARY OF THE INVENTION

According to one aspect, the present invention provides in a publish/subscribe data processing broker network having a plurality of broker data processing apparatuses each of which has an input for receiving published messages directly from a publisher application and/or receiving subscription data from a subscriber application, a first broker apparatus comprising: means for receiving via said input subscription data from a subscriber application; means for providing an acknowledgement to said subscriber application to acknowledge that the subscription data has been received; means for propagating said subscription data to a group of other broker apparatuses; means for determining whether said means for propagating has propagated said subscription data to the group of other broker apparatuses; and means for receiving via said input an indication from said subscriber application that said acknowledgement should not be sent to the subscriber application until the means for determining has determined that said means for propagating has propagated said subscription data to the group of other broker apparatuses.

According to a second aspect, the present invention provides a data processing method having method steps corresponding to each element of the data processing apparatus of the first aspect of the invention.

According to a third aspect, the present invention provides a computer readable storage medium having a computer program stored on it which, when executed on a computer, carries out the functionality of data processing method of the second aspect of the invention.

The present invention provides a subscriber with the option to specify, along with its subscription request, that the subscriber does not want its local broker to return a reply acknowledging the subscription request until the subscription has been propagated to the other brokers in the broker network. Thus, if the subscriber chooses to use this option, when the subscriber receives the reply, the subscriber can then be assured that its subscription has been propagated to the other brokers and that therefore the subscriber will receive messages published by publishers which communicate directly with such other brokers.

This gives the subscribers a high degree of confidence in the broker network, resulting in a much better chance that such a network will be chosen for widescale deployment, especially where mission critical messages needs to be exchanged.

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 1:
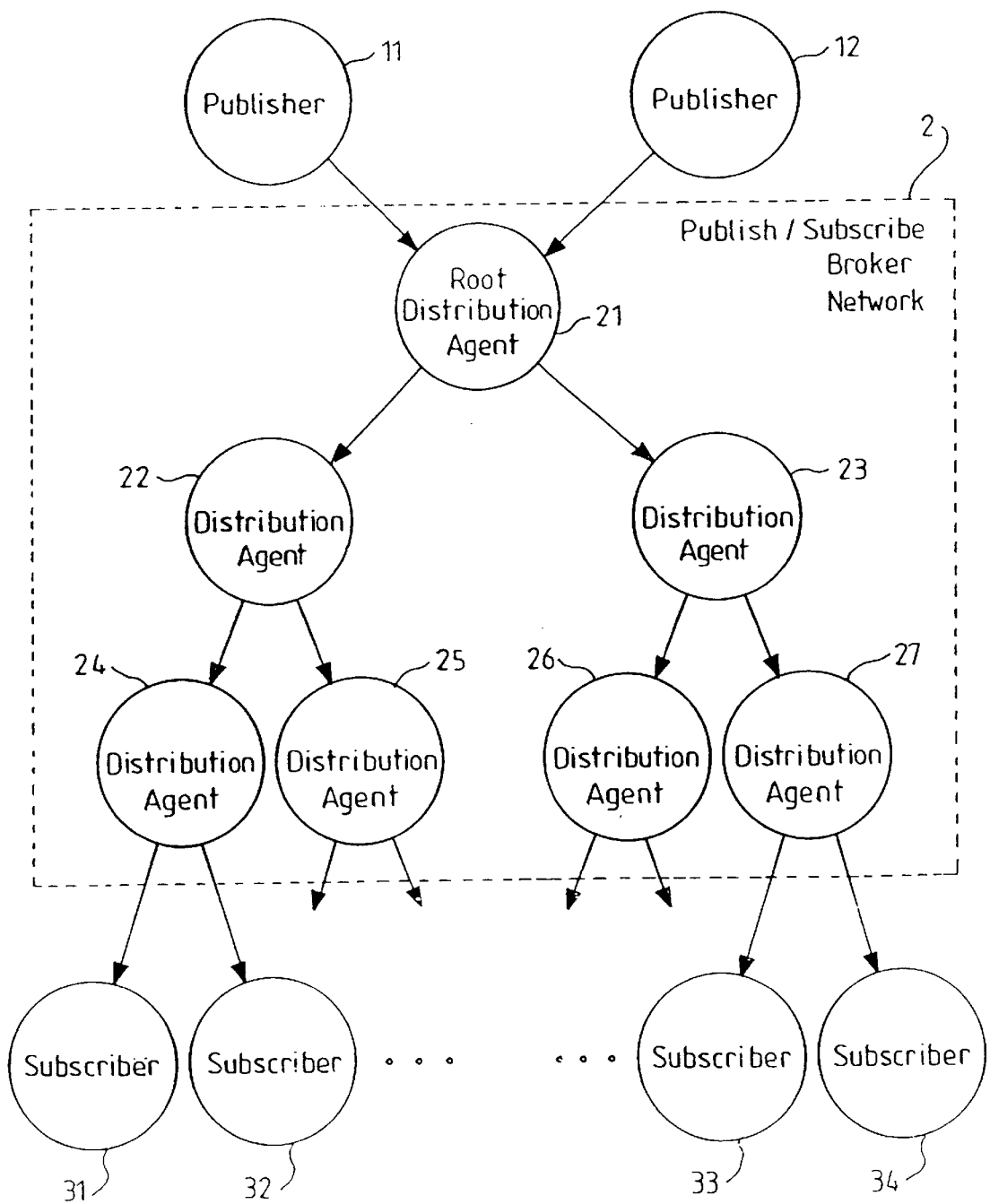
FIG. 1 shows the architecture of a prior art publish/subscribe broker network which was referred to above.

In the prior art FIG. 1 discussed above, a publisher application 11, running on one computer, is, for example, a supplier of live stock market data quotes. That is, publisher application 11 provides frequent messages stating the present value of share prices. In this example, publisher application 11 is publishing messages on a stream called "stock" which has already been configured in the broker network 2. As is well known, when publisher 11 wishes to publish a stock quote message to stream "stock", publisher 11 makes an RPC call to the root distribution agent 11 which is at the top level of the broker network tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus, whenever publisher 11 publishes a data message to stream "stock" the distribution tree structure of broker network 2 channels the message down through the root distribution agent 21, through any intermediary distribution agents (e.g., 22 in the example of FIG. 1) and through the leaf distribution agent 24 to the subscriber 32. This involves a series of RPC calls being made between each successive circle in the diagram of FIG. 1 connecting publisher 11 and subscriber 32 (i.e., 11 to 21, 21 to 22, 22 to 24 and 24 to 32).

Figure 2:
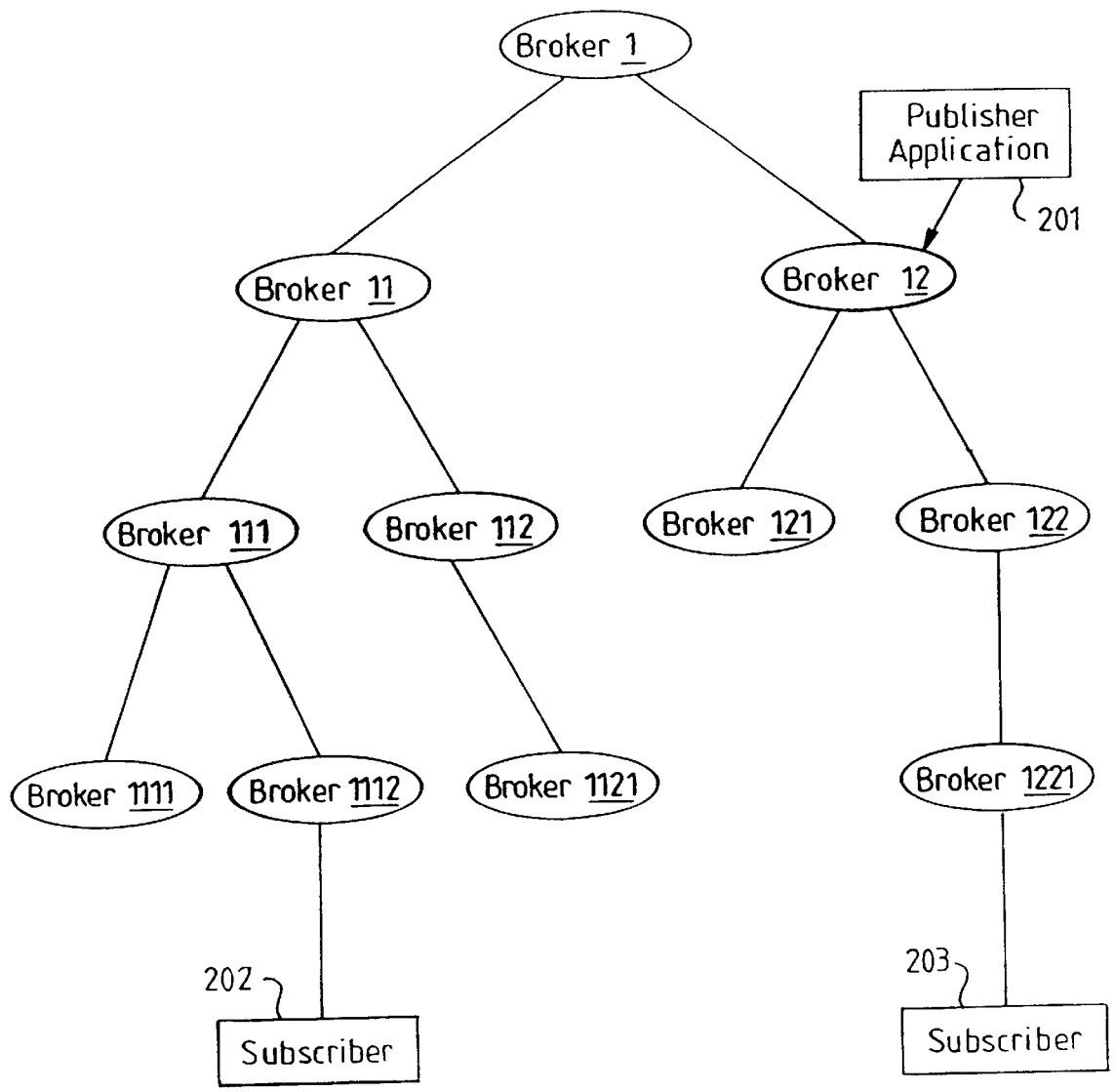
FIG. 2 shows the architecture of a publish/subscribe broker network according to which the preferred embodiment of the present invention will be explained below.

FIG. 2 shows a different publish/subscribe architecture where publisher applications can publish messages to the broker network by directly communicating with any one of a plurality of distribution agents (brokers). For example, publisher application 201 is shown communicating directly with Broker 12. There is no requirement in this architecture that all publisher applications communicate directly with a top (or root) distribution agent. Publisher application 201 can potentially communicate directly with any of the distribution agents shown in FIG. 2, in the described examples below it will be shown communicating directly with Broker 12.

Subscriber applications 202 and 203 would like to receive messages on the stream/topic that publisher application 201 is publishing on. Thus, subscriber applications 202 and 203 communicate directly with Brokers 1112 and 1221, respectively, to provide subscription data thereto informing the broker hierarchy of their desire to receive such published messages. Since the publisher application 201 is allowed to communicate directly with any of a plurality of distribution agents, the subscription data entered by the subscriber applications must be propagated throughout the broker network to each Broker shown in FIG. 2. This way, no matter which distribution agent the publisher application 201 happens to communicate directly with, the published messages will be able to be routed to the subscriber applications 202 and 203. As stated above, however, when subscriber 202 registers a subscription with its local broker 1112, subscriber 202 can not be assured that its subscription has been propagated to the other brokers throughout the network.

According to the preferred embodiment of the present invention, subscriber application 202 provides an indication (e.g., by setting a flag as part of the subscription data or by sending a separate message to broker 1112) along with a subscription request to a particular topic, such an indication informing the broker 1112 that the subscriber 202 does not want to receive an acknowledgement of its subscription request from broker 1112 until after the broker 1112 has distributed the subscription to the other brokers (or a subset of the brokers) in the network. Therefore, when the subscriber 202 eventually gets an acknowledgement from broker 1112, the subscriber 202 then can be assured that its subscription request has been propagated to the other brokers in the network (or to a selected set thereof).

Figure 3:
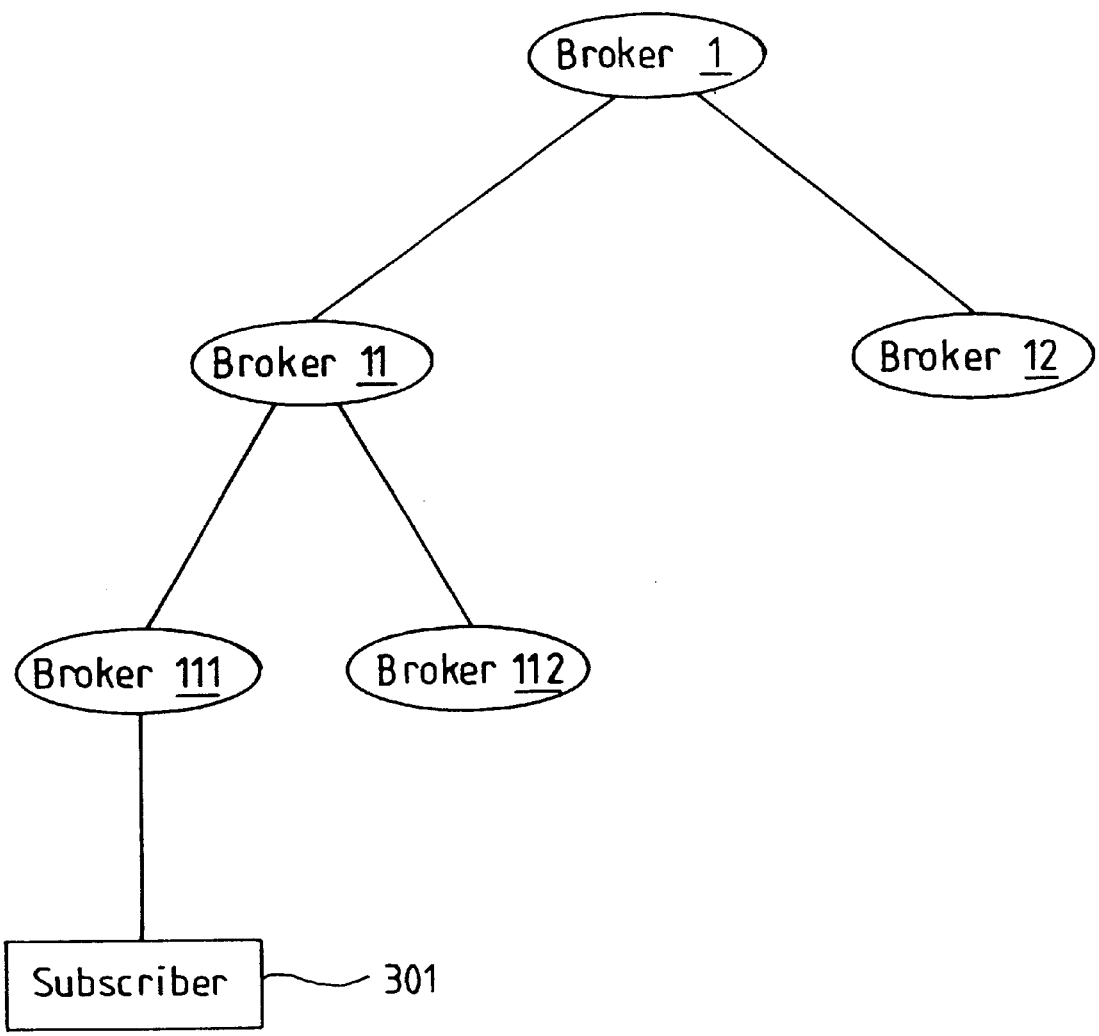
FIG. 3 shows a small group of brokers of the architecture of FIG. 2, for use in illustrating an example of the preferred embodiment of the present invention.
Figure 4:
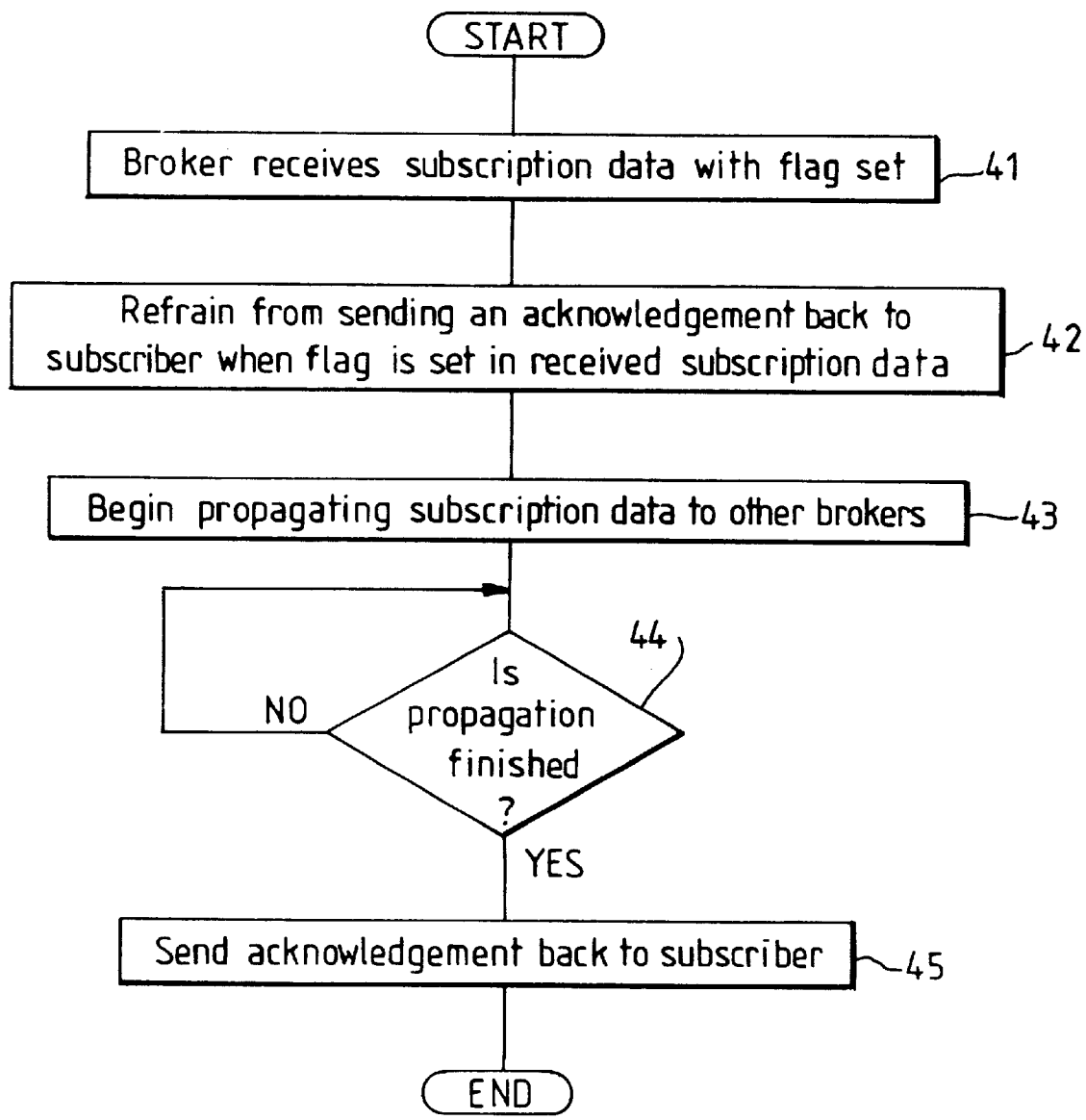
FIG. 4 is a flowchart showing the steps taken by a broker according to a preferred embodiment of the present invention.

An example will be given with reference to the block diagram of FIG. 3 and the flowchart of FIG. 4 in order to clearly explain how a preferred embodiment of the present invention works. FIG. 3 shows a group of brokers arranged according to the architecture of FIG. 2. Subscriber application 301 communicates directly with its local broker 111 to provide subscription data so as to register a subscription to the topic "IBM stock prices". Subscriber 301 is thus asking to receive published messages on the topic "IBM stock prices" no matter where the publisher application is located (i.e., the publisher application could be communicating directly with any of the brokers shown). Usually, broker 111 would then send an acknowledgement message back to subscriber 301 to tell subscriber 301 that broker 111 has received the subscription request.

The subscriber 301 wants to also be sure that each of the brokers shown has received the subscription data. Thus, subscriber 301 sets a flag in its subscription request (which is received by the broker 111 at step 41) to thus indicate to broker 111 that broker 111 should not send its usual acknowledgement back to subscriber 301 until broker 111 has propagated the subscription request to the other brokers shown in FIG. 3. In response to receipt of this flag, broker 111 refrains (step 42) from sending an acknowledgement of the receipt of the subscription request and proceeds to propagate (step 43) the subscription request to the other brokers, as will be explained below. Broker 111 then determines (step 44) whether the subscription request has been propagated to each of the other brokers (again as will be explained below) and upon making this determination, provides an acknowledgement (step 45) to subscriber 301 that firstly the subscription request was received by the broker 111 and secondly that the subscription data has been propagated to the other brokers.

It should be noted that the invention is not limited to this preferred embodiment where a single acknowledgement combines these two latter pieces of information. That is, in another embodiment, the broker 111 could indicate immediately upon receipt of the subscription request that the latter request was received and then provide a second acknowledgement, later, when broker 111 determines that the request has been propagated to the other brokers.

In the preferred embodiment, upon receiving the subscription request with the flag set as described above, broker 111 registers the subscription and forwards the request to its neighbours (just broker 11 in this case) and records the number of such neighbours (in this case "one"), since this number is the number of responses which broker 111 will expect. Broker 11 then registers the subscription and forwards the request to its neighbours (brokers 1 and 112) and records the number of such neighbours (in this case "two"). Broker 1 then registers the subscription and forwards the request to its neighbours (just broker 12) and records the number of such neighbours (in this case "one").

Broker 12 then registers the subscription and, since broker 12 has no further neighbours to propagate the subscription request on to, broker 12 has finished its propagation duties and thus sends a response to broker 1, acknowledging that broker 12 has registered the subscription. Upon receiving this response, broker 1 then decrements its recorded number of neighbours (as discussed above, this number is "one" in the case of broker 1 and FIG. 3). So, since "one" minus "one" is "zero", broker 1 has thus completed its propagation duties and thus sends a response back to broker 11.

When broker 11 receives this latter response from broker 1, broker 11 decrements its recorded number of neighbours (as discussed above, this number is "two" in the case of broker 11 and FIG. 3). Since "two" minus "one" is "one", broker 11 is not finished with its propagation duties and thus awaits a further response from broker 112.

Meanwhile, broker 112 has received and registered the subscription from broker 11, and as broker 112 has no further neighbours to propagate the subscription request on to, broker 112 has finished its propagation duties and thus sends a response to broker 11, acknowledging that broker 112 has registered the subscription. Upon receiving this response, broker 11 then decrements its recorded number of neighbours. Now, since "one" minus "one" is "zero", broker 11 has thus completed its propagation duties and thus sends a response back to broker 111. This assumes that broker 112 sends the response to broker 11 after broker 1 sends the response to broker 11. If broker 112 sends the response to broker 11 before broker 1 sends the response to broker 11, then broker 11 will decrement its count by one based on receiving the response from broker 112 and then decrement its count by one based on receiving the response from broker 1. The important thing is that broker 11 has received responses from both of its neighbours (broker 1 and broker 112) and this causes broker 11 to determine that broker 11 has finished its propagation duties and thus broker 11 sends a response to broker 111 acknowledging this.

Then, broker 111 decrements its count by "one", which returns the count to zero, and thus sends a final response to subscriber application 301, confirming that the subscription has been propagated to all brokers in the network of FIG. 3. Subscriber application 301 is then assured that its subscription request has been propagated and received by all brokers in the network. This gives the subscriber 301 a high level of trust in the publish/subscribe broker network.

We claim:

1. In a publish/subscribe data processing broker network having a plurality of broker computer systems communicating with each other via the network each of which has an input for receiving published messages directly from a publisher application and/or receiving subscription data from a subscriber application, a first broker computer system comprising:

means for receiving via said input subscription data from a subscriber application;

means for providing an acknowledgement to said subscriber application to acknowledge that the subscription data has been received in response to having received the subscription data from the subscriber application;

means for propagating said subscription data to a group of other broker computer systems;

means for determining whether said means for propagating has propagated said subscription data to the group of other broker computer systems; and means for receiving via said input an indication from said subscriber application that said acknowledgement should not be sent to the subscriber application until the means for determining has determined that said means for propagating has propagated said subscription data to the group of other broker computer systems.

2. The computer system of claim 1 wherein the means for determining keeps a count of the number of neighbouring broker computer systems to which the means for propagating has propagated the subscription data.

3. The computer system of claim 2 wherein the means for determining decrements said count when a neighbouring broker computer system sends a reply to said first broker computer system.

4. The computer system of claim 1 wherein said network is the Internet and wherein at least one of the subscriber application and the publisher application runs in conjunction with a World Wide Web browser.

5. In a publish/subscribe data processing broker network having a plurality of broker computer systems communicating with each other via the network each of which has an input for receiving published messages directly from a publisher application and/or receiving subscription data from a subscriber application, a first data processing broker method taking place in a first broker computer system comprising steps of:

receiving via said input subscription data from a subscriber application;

providing an acknowledgement to said subscriber application to acknowledge that the subscription data has been received in response to having received the subscription data from the subscriber application;

propagating said subscription data to a group of other broker computer systems;

determining whether said propagating step has propagated said subscription data to the group of other broker computer systems; and receiving via said input an indication from said subscriber application that said acknowledgement should not be sent to the subscriber application until the determining step has determined that said propagating step has propagated said subscription data to the group of other broker computer systems.

6. A computer program product stored on a computer readable storage medium and having executable steps when run on a computer system for;

receiving input subscription data from a subscriber application;

providing an acknowledgement to said subscriber application to acknowledge that the subscription data has been received, said acknowledgement being provided in response to having received said subscription data from said subscriber application;

propagating said subscription data to a group of other broker computer systems;

determining whether said propagating step has propagated said subscription data to the said group of other broker computer systems; and receiving an indication from said subscriber application that said acknowledgement should not be sent to the subscriber application until the determining step has determined that the propagating step has propagated said subscription data to the group of other broker computer systems.

* * * * *